United States Patent [19]

Nishikawa et al.

[11] 4,327,045
[45] Apr. 27, 1982

[54] COOLING PROCESS SUITABLE FOR FOAM MOLDING OF A SYNTHETIC RESIN AND ITS COOLING APPARATUS

[75] Inventors: Shigeo Nishikawa; Masaaki Yokoyama, both of Yokkaichi, Japan

[73] Assignee: Yuka Badische Company Limited, Yokkaichi, Japan

[21] Appl. No.: 133,782

[22] Filed: Mar. 25, 1980

[30] Foreign Application Priority Data

Mar. 28, 1979 [JP] Japan .................................. 54-35428

[51] Int. Cl.³ ............................................. B29D 27/00
[52] U.S. Cl. ......................................... 264/51; 249/79; 249/81; 264/102; 264/237; 425/4 R; 425/DIG. 9
[58] Field of Search ................... 264/51, 53, DIG. 10, 264/237, 102; 425/4 R, DIG. 9; 249/79, 81

[56] References Cited

U.S. PATENT DOCUMENTS

| | | | |
|---|---|---|---|
| 3,141,192 | 7/1964 | Benedetto | 264/53 X |
| 3,156,015 | 11/1964 | Harrison | 264/51 X |
| 3,809,735 | 5/1974 | Cotterell | 264/51 |
| 3,907,397 | 7/1963 | Leach et al. | 264/DIG. 10 |

Primary Examiner—Philip Anderson
Attorney, Agent, or Firm—Thomas R. Morrison

[57] ABSTRACT

This invention relates to a cooling process suitable for foam molding of a synthetic resin and its cooling apparatus. Cooling water which is supplied into a flowing pressurized gas is turbulently jetted in the form of a mist into the overall area of respective chambers in a pair of molds. The mist, adhering uniformly to the overall walls of the molds remove latent heat from the mold surface, and consequently uniformly cool the entire mold. Further, a large quantity of steam generated from the mist as well as excess mist are forcibly discharged outside the chambers by a preferred suction means including a blower, etc., whereby the cooling effect on the walls of the molds is further enhanced.

8 Claims, 3 Drawing Figures

COOLING PROCESS SUITABLE FOR FOAM MOLDING OF A SYNTHETIC RESIN AND ITS COOLING APPARATUS

BACKGROUND OF THE INVENTION

This invention relates to a cooling process suitable for foam molding of a synthetic resin and its cooling apparatus.

Generally, a foamed plastic product made of e.g. foamable styrene resin is obtained by the following process: firstly styrene resin granules containing and foaming agent is performed to produce foamable beads, then matured and finally further expanded in a pair of molds by the application of steam heat. If necessary, the foamed plastic product as molded thus may be dried further. The aforementioned processing operations are conventionally carried out as follows:

(1) Closing a male mold and a female mold between which is formed a cavity,
(2) Preheating the pair of molds by supplying steam into chambers mounted on the exterior of the molds,
(3) Opening a pair of molds a little bit (normally 2 mm to 6 mm) so that the prefoamed granules are not passable into a slight gap therebetween,
(4) Filing prefoamed beads into a cavity with air using a filling gun,
(5) Full-scale heating foaming and fusing the prefoamed beads and discharging at a steam pressure of 0.8 to 1.2 Kg/cm$^2$G after maintaining it for several seconds, Z
(6) Cooling the mold by means of water-shower and/or compressed air,
(7) Opening the mold for taking out the molded product.

The task of this invention is to obtain a cooling process most suitable in the manufacturing process of the foamed synthetic resin product, and its cooling apparatus.

The foamable synthetic resin material of this sort is heated by steam after prefoamed beads have been filled in the cavity, then prefoamed, fused and molded to the shape of the cavity. At that time, some foamed gas pressure remains inside the molded product. When taking it out of the molds, there is the danger that the molded product may be deformed due to expansion caused by residual gas pressure. In order to avoid deformation of the molded product and to obtain a foamed product equivalent to the cavity profile, an effective cooling operation is required and brings about a remarkable effect upon quality of the molded object.

Particularly when the shape of the foamed product is complicated and its thickness is not uniform, the inconvenience is that a mold cooling operation is not carried out uniformly, consequently a decline in cooling efficiency causing a longer molding cycle and poorer productivity. Accordingly, it is a very important task to develop a suitable and efficient cooling process in the manufacturing process of this sort of foamed synthetic resin product, and an apparatus for performing the coding process.

Before describing in detail a preferred example of this invention, a conventional cooling process which is being practiced will now be described. Simultaneously, the disadvantage of the conventional art will be discussed.

In FIG. 1 there are shown a pair of conventional molds 1, 2 (a female mold 1 and a male mold 2) between which is formed a cavity 3. Suitably prefoamed beads are filled into the cavity 3 by a filling gun 4. On the respective exteriors of the molds 1, 2 there are mounted chambers 5, 6. Steam is supplied to the chambers 5, 6 by the way of pipes 7, 7. The two chambers 5, 6 are provided, at preferred portions of pipes 9 for supplying cooling water, with a plurality of shower nozzles 8, 8. The pressurized cooling water is jetted from a plurality of shower nozzles 8, 8. The female mold 1 is provided with one or more eject pins 10 by which a molded foamed object A can be taken out. Numerals 7', 7' are respective drain pipes of the two chambers 5, 6.

The cooling apparatus of the above structure adopts a water spray treatment by jetting pressurized cooling water exclusively from a plurality of shower nozzles. The molds are cooled by directing the cooling water directly on the interior of the molds 1, 2.

Further, there is a known air-cooled system in which compressed air is supplied from nozzles.

Still further, there is a very simple cooling method, that is, radiation without using water, compressed air, etc.

Conventionally, either one of the above three cooling ways, i.e. a water spray cooling system, an air-cooling system and a simple radiation system or two or more of them in combination has been used.

The above second and third cooling ways have poor cooling effect and are disadvantageous, in various ways, for foam molding of a foamable synthetic resin material for purpose of high efficiency and production.

According to the water spray cooling system, it is practically impossible to locate a plurality of shower nozzles so that the cooling water can be uniformly deposited on an overall portion of the molds of a complicated shape for molding various foamed products (e.g. packaging medium) other than a simple sheet-type foamed one. As a result, one portion of the mold is cooled directly by the cooling water, but the other portion thereof is cooled indirectly, that is, out of a direct jetting of the cooling water. Such an imbalance causes the following inconveniences and disadvantages.

(1) To cool a certain portion of the mold to which the cooling water is not applied, a longer cooling time is required, and the use quantity of the cooling water is increased.
(2) A directly cooled portion of the mold is apt to be cooled excessively. Cooling water which penetrates into a slit between a chamber and a cavity of the molds may be absorbed into a molded product or may wet its surface. Such a wet molded product must be dried before packaging and shipment.
(3) As the result of the aforementioned disadvantages (1) and (2), an average mold temperature must be decreased to less than 50° C., that is, less than the required temperature. For this reason, preheating may be required or the steam quantity to be used for heating may be increased.
(4) Condensation generated when preheating the mold by steam and cooling water remaining on the mold surface hinder filling because the beads are bonded together by surface tension. Thus, conventional water-cooling system has a lot of defects. As a result, much of the heat capacity for fundamental heating foam molding is consumed uselessly, the molding cycle time is prolonged and productivity is degraded remarkably.

BRIEF SUMMARY OF THE INVENTION

It is therefore an object of this invention to provide a cooling process suitable for foam molding of a synthetic resin and its cooling apparatus, wherein a cooling water which is supplied into a flowing pressurized gas is jetted in the form of mists into the overall area or respective chambers in a pair of molds, and the mists adhering uniformly to the overall walls of the molds remove latent heat from the mold surface, consequently the whole of the molds are cooled uniformly.

It is another object of this invention to provide a cooling process suitable for foam molding of a synthetic resin, wherein by diversifying jetting directions of the cooling water from a plurality of nozzles in respective chambers, the mists jetted from the nozzles become turbulent therein, thereby the overall walls of the molds are cooled effectively.

It is a further object of this invention to provide a cooling process suitable for foam molding of a synthetic resin and its cooling apparatus, wherein a large quantity of steam generated from the mist as well as excessive mist are forcibly discharged outside the chambers by a preferred suction means including a blower, etc., whereby the cooling effect on the walls of the molds is enhanced.

Still further, in order to jet the cooling water in the form of mist by supplying it into a flowing gas, it is preferable to employ a step for making the mist turbulent by supplying the cooling water into a high-speed flowing gas and increasing the Reynolds number of the fluid and/or a step for effecting the mists speedily by supplying it into a plurality of Venturi-type nozzles in each of which a pressure reduction occurs.

Other features and advantages of the invention will be apparent from the following description.

DETAILED DESCRIPTION OF THE INVENTION

A preferred example of this invention will now be described in connection with the accompanying drawings FIGS. 2 and 3.

Figure 1:
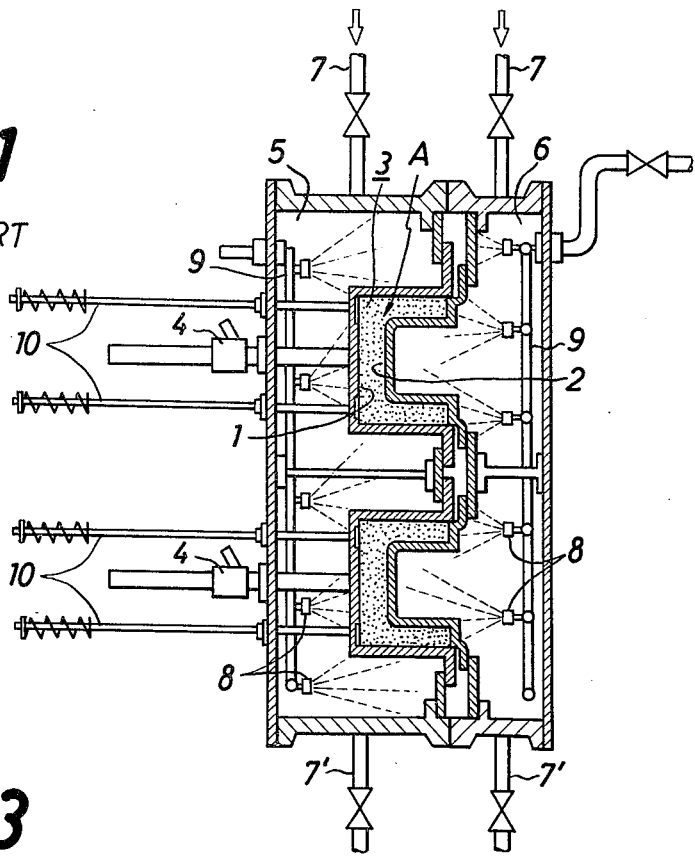
FIG. 1 is a section view of a conventional molding apparatus having a cooling means for molding a synthetic resin foam.
Figure 3:
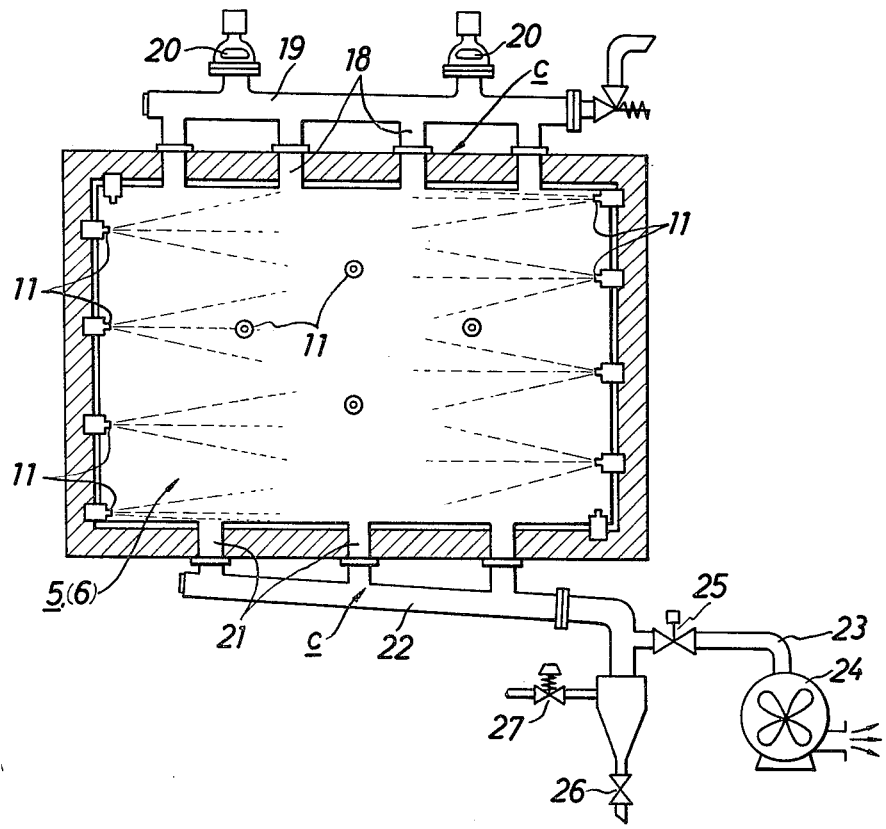
FIG. 3 is a section view of a chamber in the molding apparatus in FIG. 2.
Figure 2:
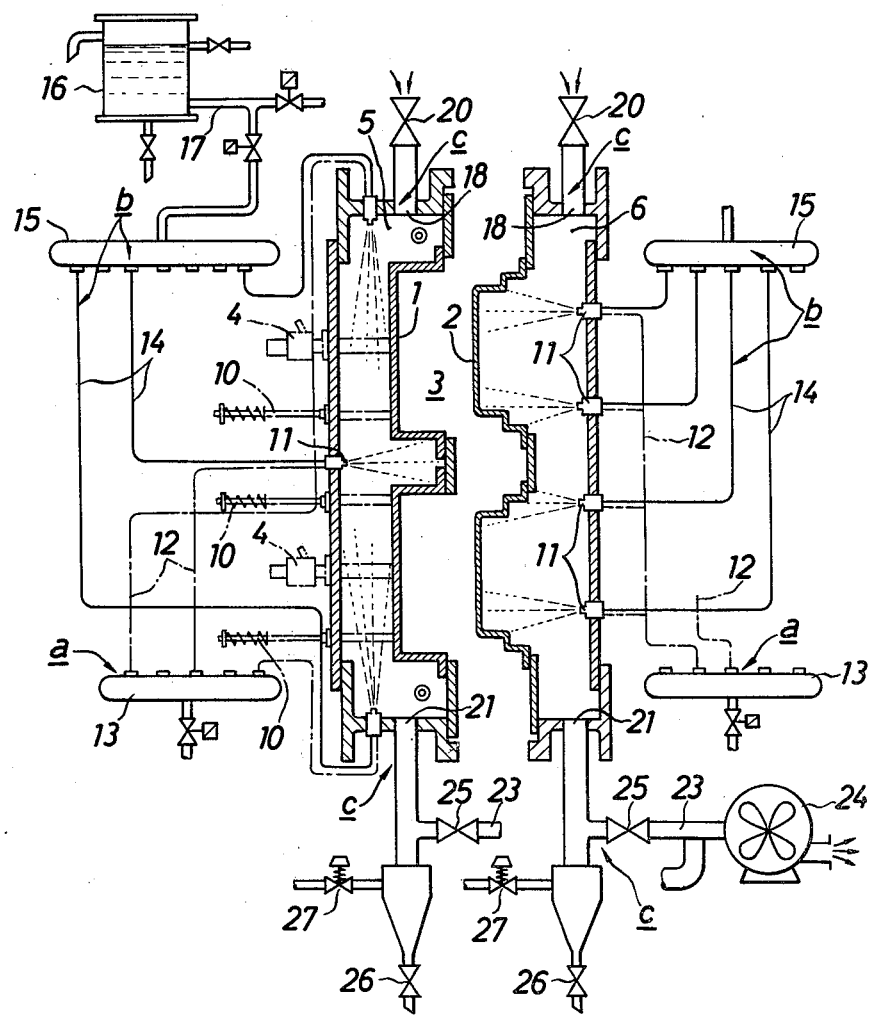
FIG. 2 is a section view of a molding apparatus according to this invention, which includes a cooling process suitable for molding a synthetic resin foam.

Numerals 1 to 10 in FIG. 1 (conventional mold) have the same functions in FIGS. 2 and 3, so that their description will be omitted.

The example according to this invention is limited to a pair of molds, but two or more pairs of molds are also mountable.

Numeral 11 is a Venturi tube type nozzle (hereinafter called "Venturi nozzle"). A plurality of Venturi nozzles 11 are mounted on the walls of the chambers 5, 6. In order to promote turbulence in the mist within each chamber, at least one Venturi nozzle 11 is directed so that its mist intersects the mist from the other nozzles. Numeral 12 is a pipe for feeding gas such as air, which is connected to each Venturi nozzle 11. A plurality of pipes 12 are connected to respective air headers 13, 13 whereby the gas is uniformly supplied to the chambers 5, 6 by way of pipes 12.

Symbol a is a pressurized gas supply means. Numeral 14 is a cooling water feeding pipe. Likewise, a plurality of pipes 14 for feeding cooling water are connected from both water headers 15, 15 to the plurality of Venturi nozzles 11 so that the cooling water can be uniformly distributed to the chambers 5, 6 respectively. The water header 15 is communicated to a water head tank 16 mounted at a higher position by way of pipes 17. The water head tank 16 is filled with water introduced from a water service pipe. Symbol b is a cooling water supply means, wherein the water is supplied to the water headers 15 by a known automatic water supply means.

A plurality of pipes 18 for exhausting steam are mounted on the upper walls of both the chambers 5, 6. Numeral 19 is a header for exhausting steam. In case the steam is not supplied into the chambers 5, 6, the header 19 has a suction valve 20 for suctioning external air. Each of the chambers 5, 6 is provided at its bottom wall with a plurality of pipes 21 for exhausting steam which are associated with an inclined header 22. Numeral 23 is a suction pipe which is connected to a suction blower 24. Numeral 26 is a drain valve associated with the header 22. Numeral 27 is a steam valve. Thus, there is formed a gas suction means c comprising the blower 24, the pipes 18, 21 and the two headers 19, 22.

Now, the cooling process of this invention will now be described.

Pressured air is supplied from the respective headers 13, 13 to a plurality of Venturi nozzles 11 which open into the chambers 5, 6. At that time, the cooling water which flows in the feeding pipes connected with the water headers 15 is jetted, in the form of mist, uniformly into the overall area of the chambers 5, 6 through a plurality of Venturi nozzles 11 having a Venturi effect. In other words, the overall surfaces of both the female mold 1 and the male mold 2 within the chambers 5, 6 are cooled uniformly.

Particularly, since a plurality of Venturi nozzles 11 are mounted directed in intersecting directions on the walls of the chambers 5, 6, the mist jetted therefrom under the support of a high-speed flowing pressurized gas are placed in a turbulent condition. As a result, molds 1, 2 are cooled very uniformly.

The mist adheres uniformly to the external surfaces of the molds 1, 2 to extract latent heat therefrom.

When suctioning a large quantity of steam and excessive mist by means of the blower 24, the suction valve 20 mounted on the header 19 is opened and the steam and mist are discharged outside the chamber. Thus, the cooling effect is remarkably enhanced.

In addition to the suctioning effect using blower 24, as mentioned previously the mist jetted in the overall area of the chambers 5, 6 has the effect to extract latent heat from the mold surface.

The advantages of the cooling process and its cooling apparatus to this invention will now be summarized as follows.

(1) Cooling water which is supplied into a flowing pressurized gas is jet in the form of mist into the overall area of respective chambers in a pair of molds, consequently the whole surfaces of the molds are be cooled simultaneously.

(2) By extracting latent heat from the mold surface, the quantity of the cooling water required is greatly reduced.

(3) Because any surface of the mold is not cooled excessively by cooling water, internal pressure in the proximity of the surface of a molded product within a cavity is not reduced. For this reason, the cooling water is less able to penetrate into the slit between the chamber and the mold cavity. Accordingly, no increase in water content of the molded product occurs and cooling water hardly contacts or remains on the surface of the molded product.

(4) Since it is possible to uniformly cool the overall surface of the mold within a certain fixed time and temperature, the cooling operation can be completed at an average mold temperature which is approximately 10° C. to 30° C. higher than the temperature in the conventional process.

(5) Since the mold temperature is high at the time of the cooling completion, it is possible to eliminate preheating of the molds. Thus, the steam quantity can be reduced greatly.

(6) Since the mold surface is considerably drier upon the completion of cooling, filling time is shortened.

(7) A post-drying treatment of the molded foamed product is done in a short time or eliminated entirely.

(8) When filling the foamable beads, mold pre-drying becomes unnecessary and the cycle time of foam molding is shortened.

(9) The example according to this invention is limited to a pair of molds, but two or more pairs of molds are also mountable as necessary. If so, much higher productivity of the cooling process according to this invention is attainable.

As many apparently widely different embodiments of this invention may be made without departing from the spirit and scope thereof, it is to be understood that the invention is not limited to the specific embodiment thereof except as defined in the appended claims.

What is claimed is:

1. A cooling process for cooling molded foam synthetic thermoplastic resin articles in a cavity in a mold prior to removal from the mold, comprising:
   providing a chamber in the mold;
   flowing gas at high speed through a plurality of nozzles into said chamber;
   introducing cooling water into said gas in said nozzles, said nozzle being effective to disperse said cooling water into mist which fills said chamber and adheres to walls of said mold to remove heat therefrom; and
   forcibly suctioning said mist and said gas from said chamber while continuing the steps of flowing and introducing whereby the step of forcibly suctioning is effective to remove said mist and steam from said chamber after said mist has removed latent heat from said mold and to permit replacement of the suctioned mist by fresh mist.

2. A cooling process as claimed in claim 1, wherein said plurality of nozzles include a Venturi tube.

3. A cooling process as claimed in claim 1, further comprising directing at least one of said nozzles so that the mist therefrom intersects the mist from at least one other of said nozzles whereby turbulence is increased in the mist within said chamber.

4. A cooling apparatus for cooling molds during molding an article of a foamable synthetic thermoplastic resin, said molds including a cavity within which said article is molded and a chamber outside said cavity for the introduction of steam to expand said foamable synthetic resin, comprising:
   a plurality of nozzles spaced apart in said chamber;
   means for passing a high speed flow of gas through said plurality of nozzles into said chamber;
   means for introducing cooling water into said high speed flow, said nozzle being effective to break up said water into a mist which fills said chamber and adheres to said molds to remove heat therefrom; and
   forcible suction means effective to remove excess mist and gas from said chamber while continuing to produce said mist whereby said mist and steam in said chamber is rapidly changed to thus remove mist which has absorbed latent heat from said mold and to permit replacement of the suctioned mist by fresh mist.

5. A cooling apparatus as claimed in claim 4, wherein at least one of the plurality of nozzles is disposed so that the flow of gas and mist therefrom intersects the flow of gas and mist from at least one other of said nozzles whereby turbulence of said mist in said chamber is increased.

6. A cooling apparatus as claimed in claim 4, wherein said means for passing a high speed flow of gas includes a gas header and a gas feed pipe from said gas header to each of said plurality of nozzles, said means for introducing cooling water into said high speed flow includes a water header and one water feed pipe from said water header to each of said nozzles, and each of said nozzles including a Venturi tube wherein a pressure drop produced by said high speed flow of gas is effective to break up said cooling water into said mist.

7. A cooling apparatus as claimed in claim 4, wherein said suction means includes a suction blower.

8. A cooling apparatus as claimed in claim 4 wherein each of said plurality of nozzles includes a Venturi tube in which a pressure of said cooling water is reduced and jetted in the form of a mist therefrom.

* * * * *